United States Patent Office 3,279,250
Patented Oct. 18, 1966

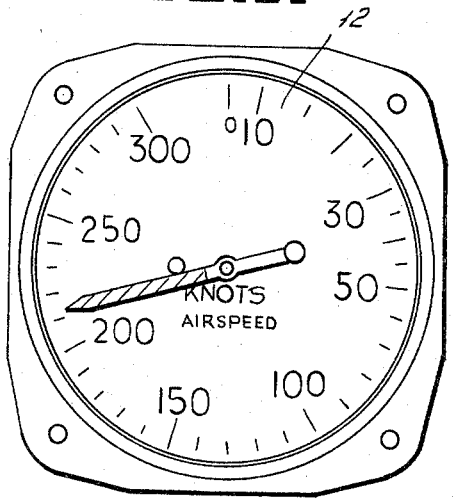
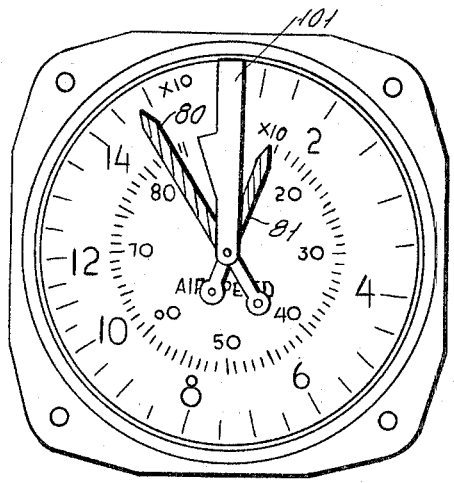
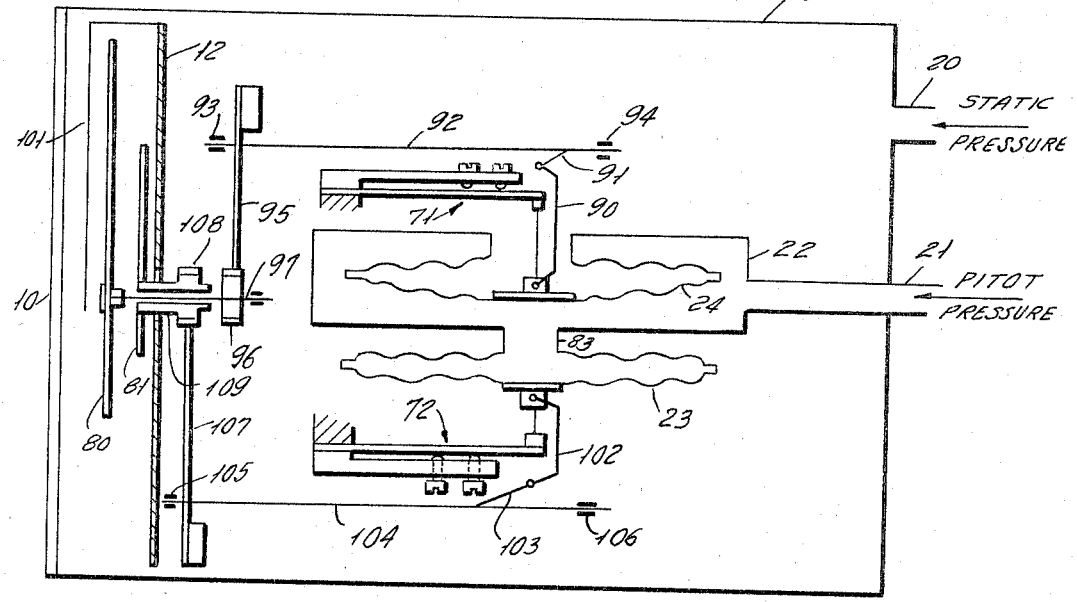
INVENTORS
HERMAN HEZEL
HEINRICH E. BARTHEL
WALTER H. RATH
BY OSTROLENK, FABER, GERB & SOFFEN
ATTORNEYS

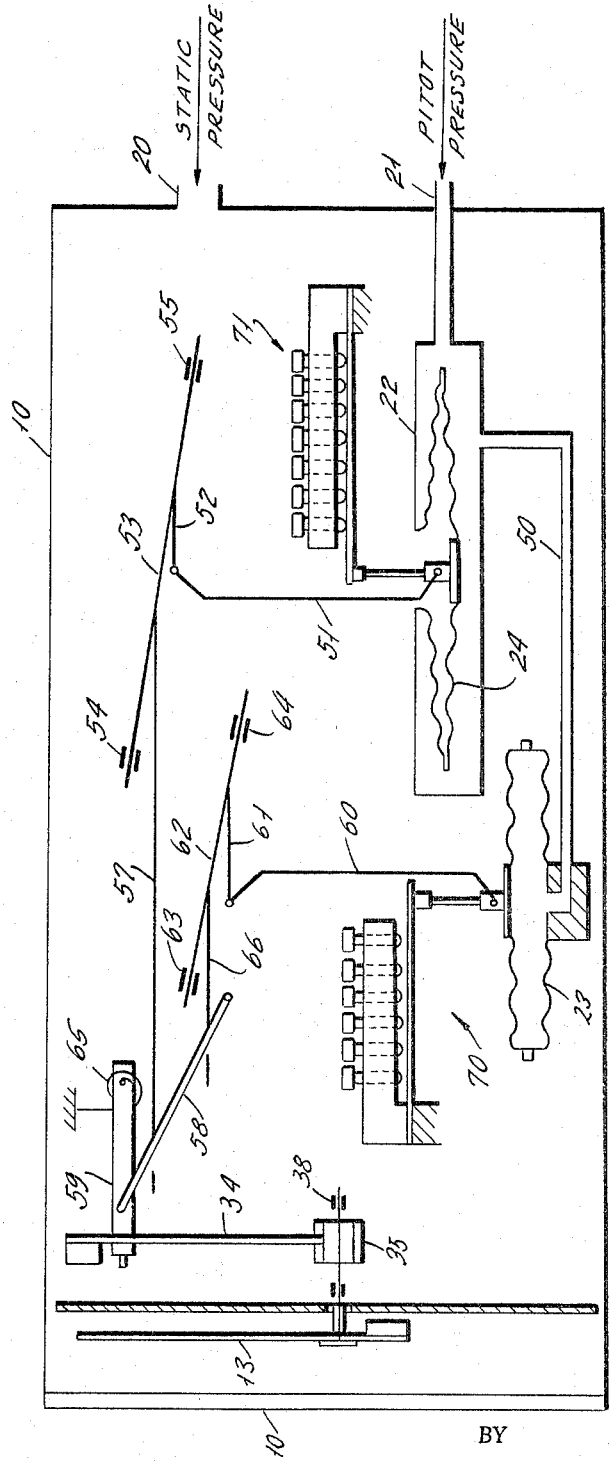

3,279,250
HIGH-LOW AIRSPEED INDICATOR
Herman Hezel, Port Washington, Heinrich E. Barthel, Ozone Park, and Walter H. Rath, Great Neck, N.Y., assignors to Kollsman Instrument Corporation, Elmhurst, N.Y., a corporation of New York
Filed Nov. 26, 1963, Ser. No. 325,892
3 Claims. (Cl. 73—182)

This invention relates to airspeed indicators, and more specifically relates to a novel airspeed indicator having a first diaphragm for low speed indication operation, and a second diaphragm for higher speed indication.

Airspeed indicators for aircraft which are accurate over a wide range of speeds including very low speeds are of great importance to aircraft such as helicopters, or other vertical take-off and landing-type aircraft, and to short-take-off and landing-type aircraft.

Thus, it is greatly desirable to provide a single instrument which provides both high and low speed indication in the range, for example, of 10 to 800 knots in a safe and foolproof manner. In the case of helicopters specifically, an airspeed indicating instrument having the range of from 10 to 300 or 400 knots is of particular importance.

Airspeed indicators of the Pitot-static type are commonly used in aircraft in present-day design. In this type system, airspeed is determined by the differential of total pressure produced by the air-stream coming to rest in the Pitot tube and the static pressure. This pressure difference is measured by applying each of the pressures across a suitable pressure responsive capsule hereinafter termed a diaphragm, whereby the deflection of the diaphragm will be transmitted to a pointer which will be driven as a function of airspeed.

Since the relationship of differential pressure to airspeed follows an exponential law, differential pressure rises so sharply with respect to airspeed that the pressure, for example, at 100 knots is approximately 100 times greater than at 10 knots, and at 800 knots is approximately 9,000 times greater than at 10 knots. Therefore, airspeed measurements at 10 knots require extremely sensitive diaphragms capable of sensing pressures of the order of 0.001 inch of mercury, while at 800 knots the equivalent pressures are at a level of approximately 43 inches of mercury, thus requiring a diaphragm of heavy and rugged construction.

It is readily apparent that these characteristics are incompatible for a single diaphragm.

The principle of the present invention is to provide a first and second diaphragm which are connected to pointer means which sweep a common dial wherein the first and sensitive diaphragm operates in the low speed range, and is caused to collapse at the end of its range, whereupon the second and higher speed range diaphragm continues to cause speed indication.

In one embodiment of the invention, the two different diaphragms may be connected to a common pointer, whereas other arrangements may be provided where each of the diaphragms sweeps its own respective pointer over different indications on the dial surface. Moreover, a novel diaphragm arrangement is provided wherein Pitot pressure is applied to the exterior of the low speed range diaphragm and static pressure is applied to the interior thereof. In the case of the high speed diaphragm, however, this arrangement may be reversed so that pressures are applied in the usual manner with Pitot pressure on the interior of the diaphragm and static pressure on the exterior thereof.

By reversing this normal application of Pitot and static pressures to the low speed diaphragm, the collapse of the diaphragm will occur when the top of its range is reached. Therefore, continued increase in the Pitot pressure during high speed operation will not cause further diaphragm extension to damage the sensitive diaphragm.

As a further feature of the invention, at least the sensitive diaphragm is formed in such a manner that the convolutions on its two sides are arranged to nest with respect to one another, whereby upon collapse of the diaphragm, a rigid body is formed which cannot be distorted by the further application of exterior or exterior pressure to the collapsed body.

Accordingly, a primary object of this invention is to provide a novel wide range airspeed indicator.

Another object of this invention is to provide a novel high-low airspeed indicator wherein a single indicator will indicate airspeeds in the range of 10 to at least 400 knots.

A further object of this invention is to provide a low speed, high sensitivity diaphragm and high speed relatively low sensitivity diaphragm in a common instrument for driving a common pointer system.

A further object of this invention is to provide a novel driving system for a low speed, high sensitivity diaphragm whereby the diaphragm is collapsed over nested convolutions when a predetermined speed is reached so that increased pressure application will not damage the diaphragm.

These and other objects of this invention will become apparent from the following description when taken in connection with the drawings, in which:

FIGURE 1 schematically illustrates a first embodiment of the invention.

FIGURE 2 shows a front view of the dial surface of the device manufactured as illustrated for FIGURE 1.

FIGURE 3 shows a second embodiment of the invention wherein the diaphragms are mechanically separated.

FIGURE 4 shows a still further embodiment of the invention wherein each of the diaphragms drives a respective pointer.

FIGURE 5 is a front view of the dial surface of FIGURE 4.

Figure 1:
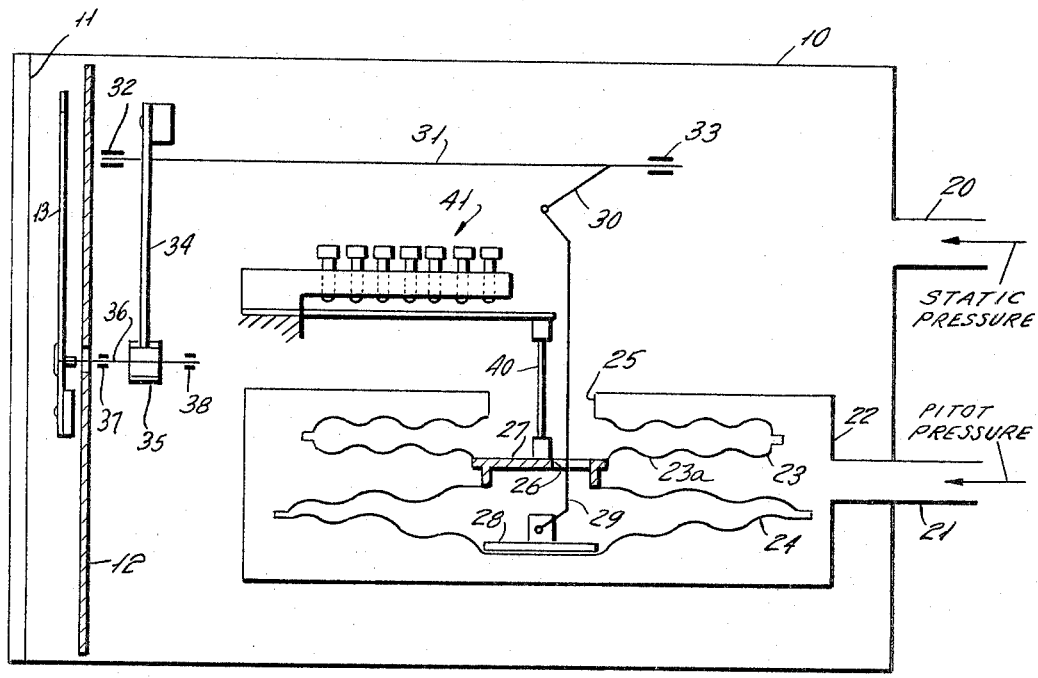

Referring first to FIGURE 1, we have schematically illustrated therein an airspeed indicator which is comprised of a sealed case 10 which has a glass cover plate 11 over its left-hand end. The glass cover plate 11 exposes a dial surface 12 (FIGURES 1 and 2) over which a single pointer 13 is moved. It will be noted that the dial surface 12 is nonlinear with relatively large spacing in the low speed range for accurate reading in the low speed range.

The interior of case 10 is then connected to a suitable conduit 20 which has static pressure applied thereto, while a second conduit 21 extends into case 10 and is connected to a suitable Pitot tube mounted on the aircraft and brings Pitot pressure into the diaphragm housing 22.

The diaphragm housing 22 contains two diaphragms 23 and 24 respectively, wherein diaphragm 23 is primarily used for high speed indication and is of rugged construction, while diaphragm 24 is used for low speed indication and is of very sensitive construction.

The interior of diaphragm 23 is then exposed to the static pressure within case 10 by virtue of the opening 25. In a similar manner, the interior of diaphragm 24 is exposed to the static pressure within case 10 by virtue of opening 26 in cap 27. Note that this is a reversal of the usual application of pressures to airspeed diaphragms.

The lower side 24a of diaphragm 24 then has a pad 28 therein which is pivotally connected to a suitable output link 29 which is, in turn, pivotally connected to crankshaft 30 of rocker arm 31. Rocker arm 31 is a pivotally mounted arm pivoted, for example, in bearings 32 and 33, and has a sector gear or other suitable drive transmitting means 34 secured thereto. The sector gear 34 then meshes with gear 35 which is directly secured to shaft 36 which is pivotally mounted in bearings 37 and 38. The left-hand end of shaft 37 extends through an opening in dial 12 and is directly secured to pointer 13.

It will be noted that the member 27 has a link 40 which is secured to a compensating mechanism 41 of the well-known type.

Figure 2A:
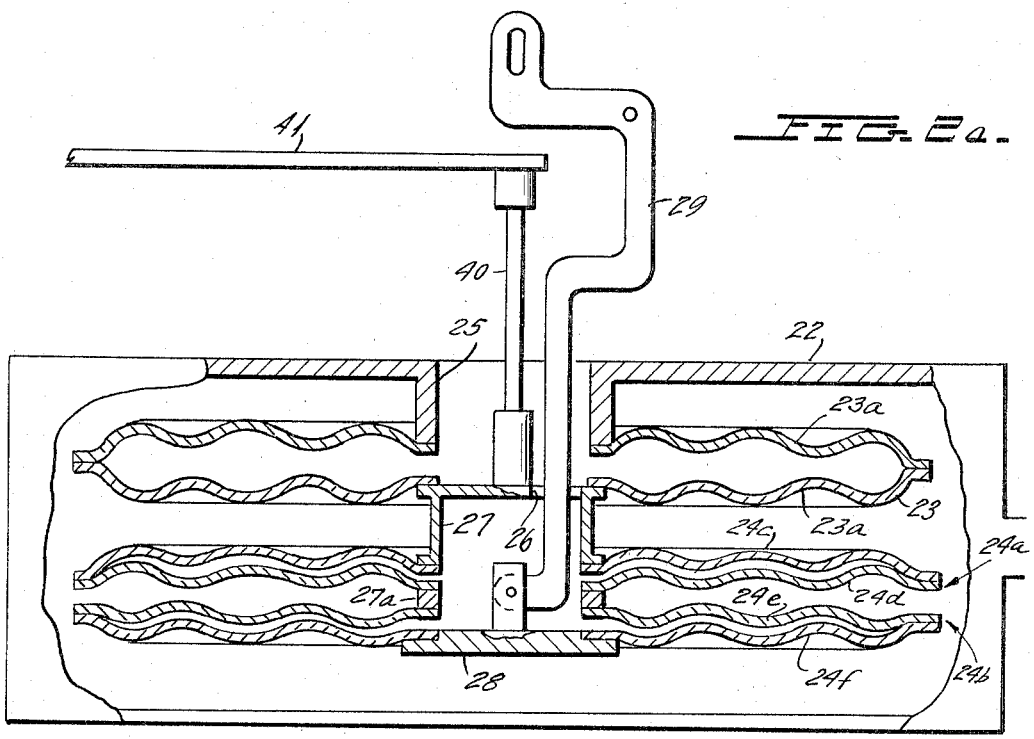
FIGURE 2a is a cross-sectional view of a specific diaphragm arrangement which could be used for the device of FIGURE 1 in which the convolutions can nest into one another and a dual arrangement is used for the sensitive diaphragm arrangement.

One specific manner in which the schematically illustrated diaphragms of FIGURE 1 can be arranged is illustrated in FIGURE 2a where components similar to those of FIGURE 1 are given similar identifying numerals. FIGURE 2 shows the high speed diaphragm 23 as having opposing sides 23a and 23b of the usual type arrangement. However, the low speed and sensitive diaphragm 24 of FIGURE 1 is shown in FIGURE 2 as being composed of two separate, identical diaphragms 24a and 24b which have opposing sides 24c–24d, and 24e–24f respectively. The side 24c is secured to cap 27 while sides 24d and 24e are joined by ring 27a. The side 24f is then secured to pad 28.

This novel dual construction permits greater deflection of the diaphragms 24a and 24b over the low speed range.

In operation of the devices of FIGURES 1 and 2, and during low speed operation in the 10 to 150 knot range, the Pitot pressure will rapidly increase, thus causing the contraction of diaphragms 24a and 24b. As the diaphragms 24a and 24b collapse, pad 28 will move upwardly, thus causing a rotation of rocker arm 31 in a direction to bring the bottom of sector gear 34 in a direction out of the drawing of the paper. This causes rotation of gear 35, and thus shaft 36 and pointer 13 in a clock-wise direction in FIGURE 2, indicating an increase in airspeed.

The diaphragms 24a and 24b are so constructed that when a predetermined limiting airspeed is reached, the diaphragms will be completely collapsed. As particularly shown in FIGURE 2a, the convolutions in sides 24c–24d, and 24e–24f of diaphragms 24a and 24b respectively will nest within one another during this fully compressed position whereby the continued increase in Pitot pressure externally of diaphragms 24a and 24b will not cause distortion thereof. This same type nesting construction can be used for diaphragm 23.

After collapse of the diaphragms 24a and 24b, and as the airspeed increases, for example, to the 150 to 850 knot range, the continued increase in Pitot pressure now causes an accurately measurable compression of the more ruggedly constructed diaphragm 23.

It will be noted that the lower surface 23a of diaphragm 23 is secured to member 27 along with the upper surface 24e of diaphragm 24a. Accordingly, the compression motion of diaphragm 23 will cause member 27, and thus the diaphragms 24a and 24b to move upwardly whereby an upward motion is transmitted to output link 29 and thus continued rotation of rocking shaft 31 occurs. This continued rotation of rocking shaft 31 will cause the airspeed indication by pointer 13 in the range of from 150 to 850 knots, or any other desired preselected range. Accordingly, the single pointer 13 will sweep over a full range of from 10 to 850 knots with high accuracies in both the low speed and high speed ranges of indication.

A second embodiment of the invention wherein a single pointer can be used for sweeping both the high and low speed ranges of air speed indication is shown in FIGURE 3 wherein the diaphragms are mounted differently than in FIGURE 1. More specifically, in FIGURE 3 where components similar to those of FIGURE 1 are given similar identifying numerals, the low speed responsive diaphragm 24 is mounted separately from the high speed indicating diaphragm 23. Moreover, in FIGURE 3, only diaphragm 24 is contained within the Pitot pressure housing 22, and the Pitot pressure is applied to the interior of diaphragm 23 over conduit 50. The exterior of diaphragm 23 is then exposed to static pressure, whereby static and Pitot pressures are applied to diaphragm 23 in the usual manner. Note that in FIGURE 1, the application of Pitot and static pressures to diaphragm 23 are reversed from their normal mode of application.

The low speed diaphragm 24 then has its lower wall connected to a suitable link 51 which is, in turn, pivotally connected to a crankshaft 52 of a rockingshaft 53 which is pivotally mounted in bearing 54 and 55. Clearly, the low speed diaphragm can be formed as illustrated in FIGURE 2a.

An output arm 57 then extends from shaft 53 and engages the bottom of an extending arm 58 which extends from a rotatable shaft 59 (equivalent to shaft 31 of FIGURE 1) which rotates sector gear 34.

Accordingly, within the speed range of, for example, 10 to 150 knots and as speed increases, the Pitot pressure increases. Accordingly, the diaphragm 24 begins to collapse, thus causing an upward movement of link 51. This, in turn, causes a rotation of shaft 53 in a clockwise direction to cause arm 57 to rotate and move arm 58 upwardly, thus rotating shaft 59, sector gear 34, gear 35 and thus pointer 13 in the direction showing an increased speed. Note that the shaft 58 engages shaft 57 over a relatively short arm so that a relatively large pointer movement will be achieved from a relatively short movement of diaphragm 24. This permits the lower speed range to be spread out over a large area of the dial face.

Once the maximum speed such as 150 knots is reached for the low speed indicating range diaphragm 24, the diaphragm is completely collapsed so that it cannot transfer continued motion to shaft 59. At this point, the indication at speeds higher than 150 knots is assumed by the high speed range indicating diaphragm 23.

More specifically, the diaphragm 23 is connected to a suitable output link 60 which is, in turn, connected to crank arm 61 of rockingshaft 62. Rockingshaft 62 is mounted for rotation in bearings 63 and 64. Rockingshaft 62 then has an arm 66 which engages shaft 58 over a relatively large moment arm, as compared to the moment arm between arm 57 and arm 58. Accordingly, as diaphragm 23 expands due to increasing airspeed as represented by an increase in the ratio of Pitot pressure to static pressure, arm 60 moves upwardly so that shaft 62 rotates clockwise to cause arm 66 to drive arm 58 in a direction to rotate sector gear 34 and thus pointer 13 in a clockwise direction in FIGURE 2.

In order to insure contact between arms 58, 57 and 60, a hairspring 65 may be provided for shaft 59 to bias shaft 58 downwardly.

It is to be noted that suitable compensating mechanism of the well-known type can be provided for each of diaphragms 23 and 24, and is schematically illustrated as compensating mechanism 70 and 71 respectively.

While the embodiments of FIGURES 1 and 3 each provide a single pointer indication, as shown in FIGURE 2, it is possible to adapt the present invention so that there will be a respective pointer for each respective speed range, as shown in FIGURES 4 and 5.

Referring now to FIGURES 4 and 5, and with components similar to those of FIGURES 1, 2 and 3 having similar identifying numerals, it will be seen that each of diaphragms 23 and 24 are provided with their own force transmitting linkages, whereby the low speed range diaphragm 24 ultimately drives pointer 80 over a first dial face portion (FIGURE 5) which indicates from 0 to 150 knots, for example, while the high speed diaphragm 23 drives a second pointer 81 over an inner scale which indicates from 0 to 850 knots.

The diaphragm 24, as was the case in the previous embodiments, has Pitot pressure applied to the exterior thereof and static pressure to the interior thereof by virtue of the housing 22 surrounding diaphragm 24. Clearly, diaphragm 24 can be arranged as shown in FIGURE 2a.

The high speed range diaphragm 23 is driven in a manner similar to that of FIGURE 3, whereby Pitot pressure is applied to its interior through channel 83 which communicates with chamber 22, while the static pressure is applied to its exterior surface.

The lower surface of diaphragm 24 is then connected to link 90 which is, in turn, connected to crankshaft 91 of rockingshaft 92 which is pivotally mounted in bearings 93 and 94. The rockingshaft 92 is further directly secured to sector gear 95 which drives gear 96 which is connected to the pivotally mounted interior shaft 97 which is directly secured to pointer 80.

Accordingly, as diaphragm 24 is deflected within the speed range of 0 to 150 knots, the pointer 80 will be appropriately positioned. Once, however, a speed of 150 knots, for example, is reached, the pointer 80 will reach its full reading position which lies under a masking strip 101. Pointer 80 remains under masking strip 101 for all speeds beyond this point, since diaphragm 24 is completely collapsed and cannot deflect any further.

For speeds beyond 150 knots and up to 850 knots, all indications are read from pointer 81 which is driven by diaphragm 23. Pointer 81 is hidden behind strip 101 while pointer 80 is indicating between 10 to approximately 130 knots at which point pointer 81 appears and begins indicating. More specifically, diaphragm 23 is provided with an output link 102 which is pivotally connected to crank arm 103 of rockingshaft 104 which is pivotally mounted in pivots 105 and 106. Rockingshaft 104 is then connected to sector gear 107 which, in turn, meshes with a gear 108 which is mounted concentrically with shaft 97, but is rotatable independently of shaft 97. The pointer 81 is then mounted directly on an extending sleeve 109 of gear 108.

Accordingly, as speed increases, and diaphragm 23 expands, this motion is transmitted directly to pointer 81 which sweeps over its respective dial surface with the pointer 80 being obscured from view beneath mask 101 to avoid pilot conduction.

Although this invention has been described with respect to its preferred embodiments, it should be understood that many variations and modifications will now be obvious to those skilled in the art, and it is preferred, therefore, that the scope of the invention be limited not by the specific disclosure herein but only by the appended claims.

The embodiments of the invention in which an exclusive privilege or property is claimed are defined as follows:

1. An airspeed indicator comprising a first pressure responsive capsule, a second pressure responsive capsule, and an indicator means; said first pressure responsive capsule being operable in a low airspeed range; said second pressure responsive capsule being operable in a high speed range; and connection means for connecting said first and second pressure responsive capsule to said indicator means; said airspeed indicator being connectable to a source of static pressure and a source of Pitot pressure; said source of static pressure being connected to the interior of said first pressure responsive capsule; said source of Pitot pressure being connected to the exterior of said first pressure responsive capsule; the differential of static to Pitot pressure being connected across said second pressure responsive capsule; said connecting means including first connecting means extending from said first pressure responsive capsule to said indicator means and second connecting means extending from said second pressure responsive capsule to said indicating means.

2. The indicator of claim 1 wherein said second pressure responsive capsule has Pitot pressure connected to the interior thereof.

3. The indicator of claim 1 wherein said indicator means includes a first and second pointer means, said first connecting means being connected to said first pointer means, said second connecting means being connected to second pointer means.

References Cited by the Examiner
UNITED STATES PATENTS

| | | | |
|---|---|---|---|
| 2,185,971 | 1/1940 | Achtel et al. | 73—410 |
| 2,565,472 | 8/1951 | Castel et al. | 73—182 |
| 2,925,829 | 2/1960 | Thompson | 92—45 |

LOUIS R. PRINCE, *Primary Examiner.*

D. O. WOODIEL, *Assistant Examiner.*